US006742104B2

(12) United States Patent
Chauvel et al.

(10) Patent No.: US 6,742,104 B2
(45) Date of Patent: May 25, 2004

(54) MASTER/SLAVE PROCESSING SYSTEM WITH SHARED TRANSLATION LOOKASIDE BUFFER

(75) Inventors: Gerard Chauvel, Antibes (FR); Dominique D'Inverno, Villeneuve-Loubet (FR); Serge Lasserre, Frejus (FR)

(73) Assignee: Texas Instruments Incorporated, Dallas, TX (US)

( * ) Notice: Subject to any disclaimer, the term of this patent is extended or adjusted under 35 U.S.C. 154(b) by 355 days.

(21) Appl. No.: 09/932,607

(22) Filed: Aug. 17, 2001

(65) Prior Publication Data

US 2002/0065989 A1 May 30, 2002

(30) Foreign Application Priority Data

Aug. 21, 2000 (EP) .............................. 00402331
May 28, 2001 (EP) .............................. 01401384

(51) Int. Cl.[7] .................... G06F 12/08; G06F 12/10
(52) U.S. Cl. .................. 711/207; 711/130; 711/145
(58) Field of Search ........................... 711/130, 207, 711/145

(56) References Cited

U.S. PATENT DOCUMENTS 4,481,573 A  11/1984  Fukunaga et al.
5,404,476 A  * 4/1995  Kadaira .................... 711/207

FOREIGN PATENT DOCUMENTS

EP  0 382 237 A2  8/1990
EP  0 642 086 A1  3/1995

OTHER PUBLICATIONS

Advanced RISC Machines Limited 1990, MEMC2, Technical Reference Manual, Part No. 2201,391, Issue 1, Dec. 1990, pp. 1–12.

* cited by examiner

Primary Examiner—Kevin Verbrugge
(74) Attorney, Agent, or Firm—Robert D. Marshall, Jr.; W. James Brady, III; Frederick J. Telecky, Jr.

(57) ABSTRACT

A multiprocessor system (20, 102, 110) uses multiple operating systems or a single operating system uses μTLBs (36) and a shared TLB subsystem (48) to provide efficient and flexible translation of virtual addresses to physical addresses. Upon misses in the μTLB and shared TLB, access to a translation table in external memory (54) can be made using either a hardware mechanism (100) or a software function. The translation can be flexibly based on a number of criteria, such as a resource identifier and a task identifier. Slave processors, such as coprocessors (34) and DMA processors (24) can access the shared TLB 48 without master processor interaction for more efficient operation.

28 Claims, 6 Drawing Sheets

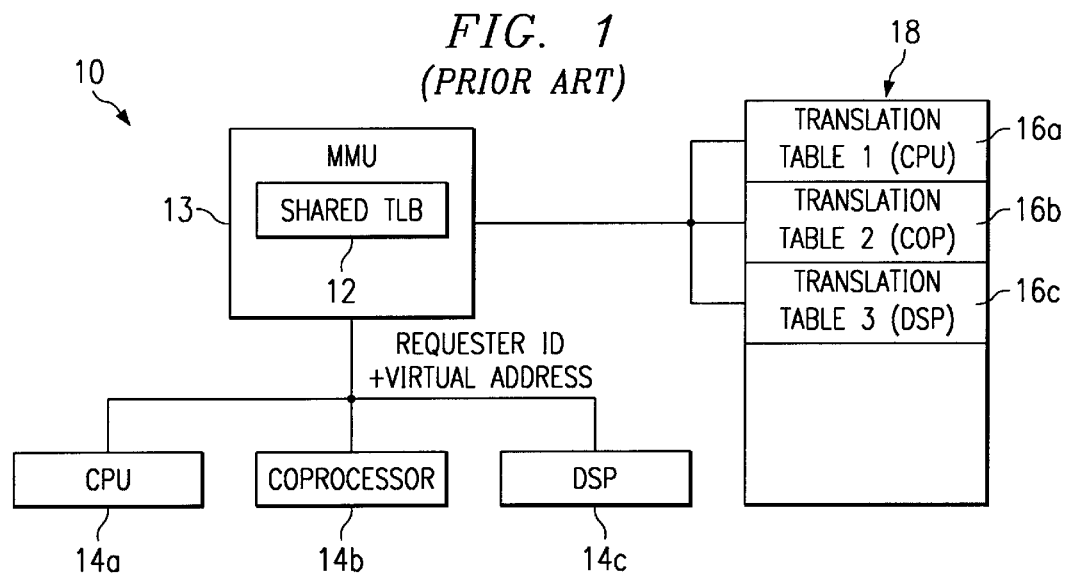
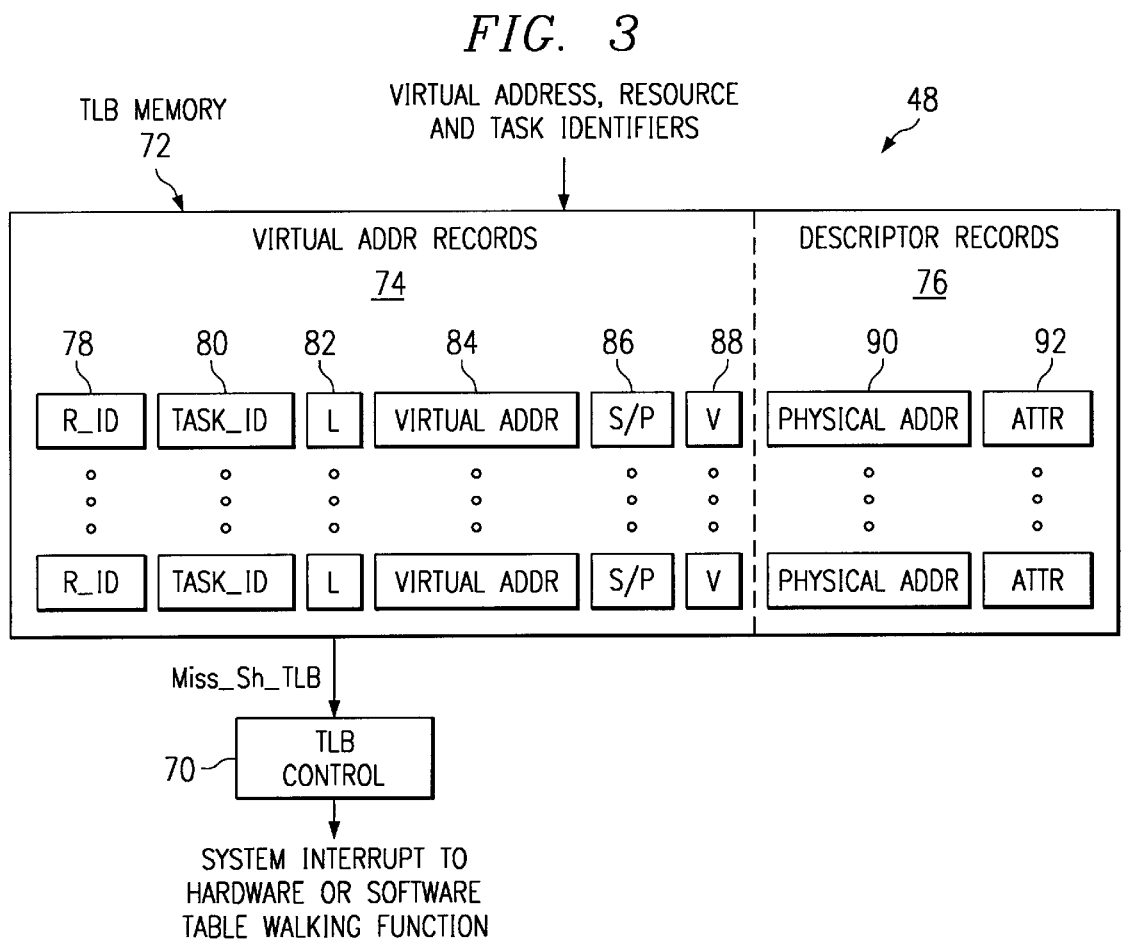

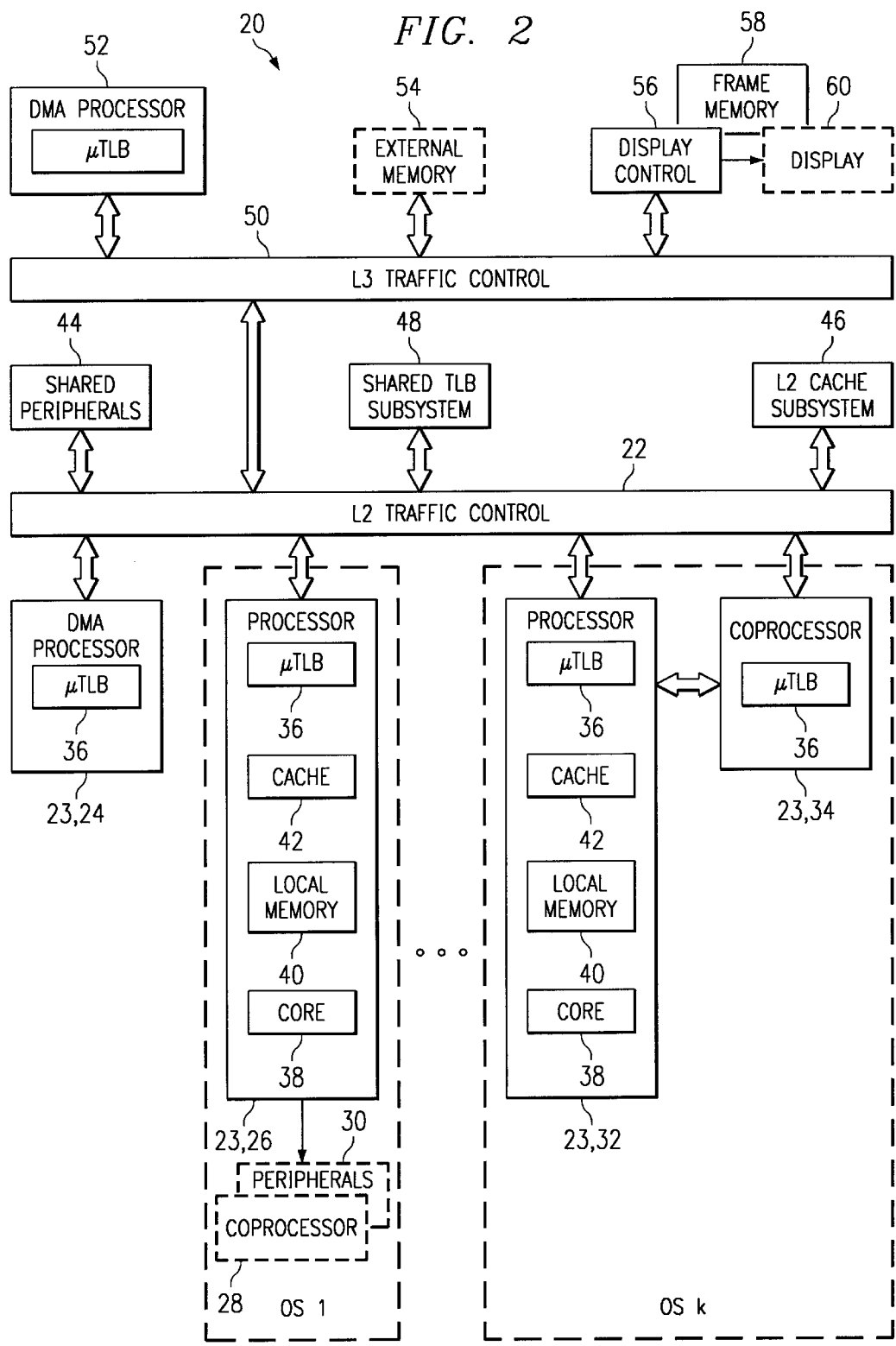

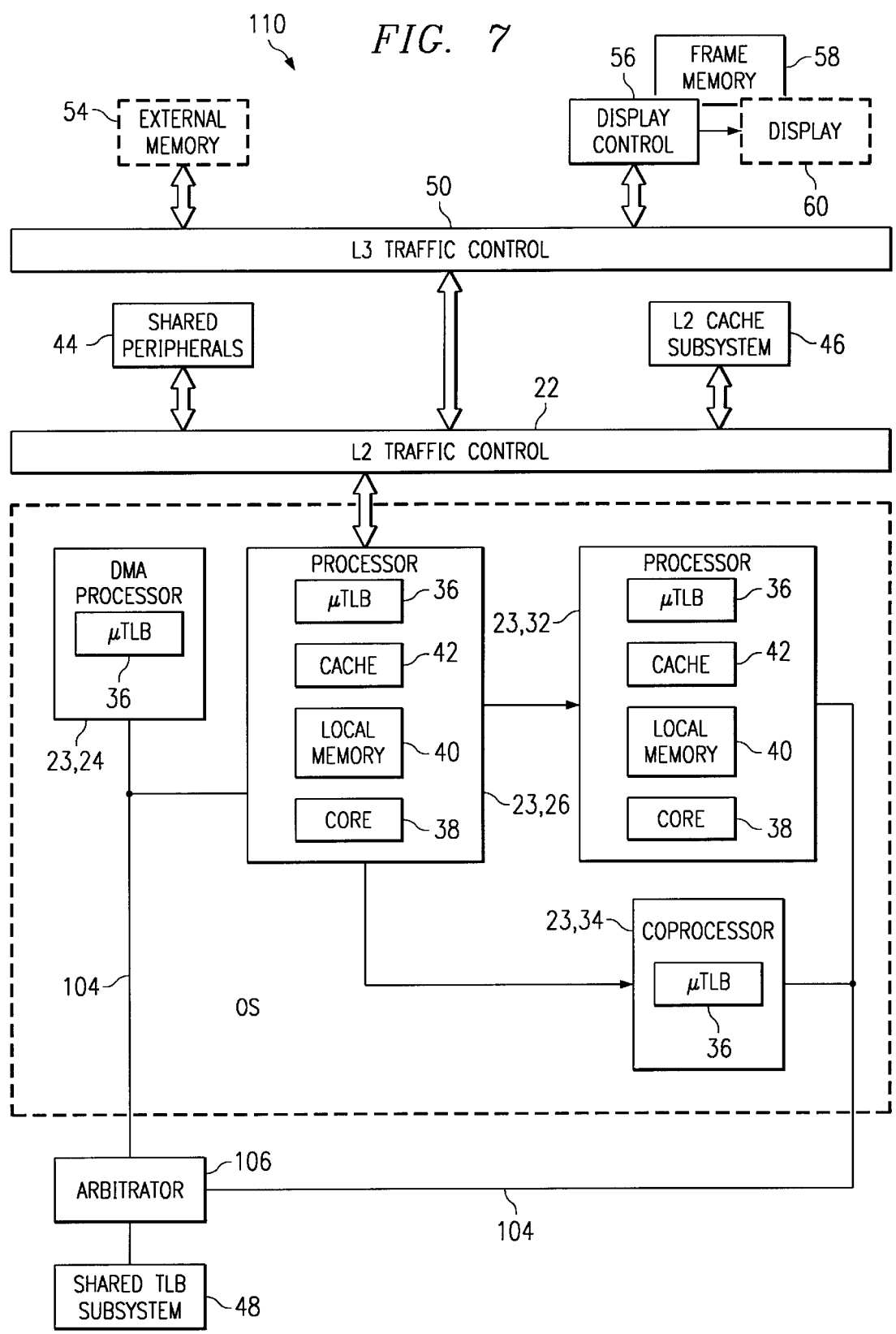

MASTER/SLAVE PROCESSING SYSTEM WITH SHARED TRANSLATION LOOKASIDE BUFFER

This application claims priority to European Application Serial No. 00402331.3, filed Aug. 21, 2000 and to European Application Serial No. 01401384.1, filed May 28, 2001 U.S. patent application Ser. No. 09/932,651 is incorporated herein by reference.

STATEMENT OF FEDERALLY SPONSORED RESEARCH OR DEVELOPMENT

Not Applicable

BACKGROUND OF THE INVENTION

1. Technical Field

This invention relates in general to multi-processor architectures and, more particularly, to a shared translation lookaside buffer in a multi-processor architecture.

2. Description of the Related Art

Many new electronic devices make use of a multi-processor environment that includes DSPs (digital signal processors), MPUs (microprocessor units), DMA (direct memory access units) processors, and shared memories.

The types of tasks performed by a device often have specific real time constraints due to the signals that they are processing. For example, DSPs are commonly used in devices where video and audio processing and voice recognition are supported. These functions can be significantly degraded if part of the multi-processor system must suspend processing while waiting for an event to occur. Performing memory address translations from virtual address used by a task to physical addresses necessary to access the physical memory can be time consuming and degrade performance for a real-time task. To reduce the latencies caused by address translation, a TLB (translation lookaside buffer) is commonly provided as part of a MMU (memory management unit). The translation lookaside buffer caches recently accessed memory locations. At the beginning of a memory access, the TLB is accessed. When a TLB (translation lookaside buffer) cache does not contain the information corresponding to the current access (i.e., a TLB-"miss" or "page fault"), the information must be retrieved from tables ("table walking"), located in main memory. This operation takes tens to hundreds of microprocessor cycles. While the MMU is walking the tables, the operation of the core is blocked, resulting in degraded or errant performance of the processor.

In a multiprocessor system, several separate processing devices may be performing virtual address translation in order to access the physical memory. In one solution shown in FIG. 1, of the type used by the ARM MEMC2, a multiprocessor device 10 uses a shared TLB 12 accessible by multiple processing devices 14 (individually referenced as processing devices 14a–c). Each processing device 14 has a unique requester identifier that is concatenated to a virtual address to form a modified virtual address. The concatenation is performed in order to present unique virtual addresses to the shared TLB 12, since the virtual address range used by the various processors that access the shared TLB 12 may otherwise overlap, thereby presenting a possibility that the wrong physical address may be retrieved from the TLB 12.

If there is a miss in the shared TLB 12, the virtual address is translated to a physical address through translation tables 16 (individually referenced as translation tables 16a–c in FIG. 1) in the physical memory 18. The requester identifier in the concatenated address provides a starting base address in the external memory's translation table section. Thus, each potential requester has its own translation table under this approach, which is an inefficient use of memory and provides no flexibility in translating a virtual address.

Accordingly, there is a need for a flexible method and circuit for translating virtual addresses to physical addresses in a multiprocessor device.

BRIEF SUMMARY OF THE INVENTION

In the present invention, an integral multiprocessing device comprises a plurality of processing devices, including one or more master processors, each master processor with one or more associated slave processing devices, and a shared translation lookaside buffer coupled to the plurality of processing devices for storing information relating virtual addresses with physical address in a main memory. The slave processors may access the shared translation lookaside buffer without intervention of the associated master processor.

The present invention provides more efficient operation by allowing certain devices, such as coprocessors and DMA processors, to access a shared TLB to perform logical to physical address translations without interfering with the operation of an associated master processor.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1 is a general block diagram of a prior art multi-processor device;

FIG. 2 illustrates a multiprocessor device, using multiple operating systems, with enhanced shared TLB capabilities;

FIG. 3 illustrates a shared TLB subsystem for a multiple operating system device;

FIG. 7 illustrates a multiprocessor device, using a single operating systems, with enhanced shared TLB capabilities;

DETAILED DESCRIPTION OF THE INVENTION

Figure 4:
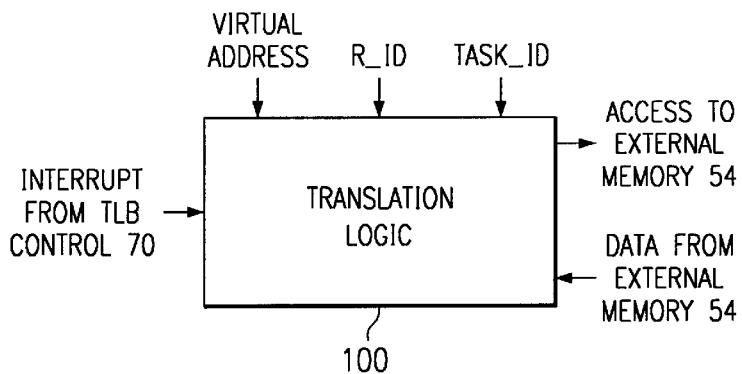
FIG. 4 illustrates a hardware translation control circuit.

The present invention is best understood in relation to FIGS. 1–8 of the drawings, like numerals being used for like elements of the various drawings.

FIG. 2 illustrates a block diagram of a first embodiment of a general multiprocessor system 20. The multiprocessor system 20 includes a plurality of processors 23 coupled to a level two (L2) traffic control circuit 22. The processors 23 coupled to the L2 traffic control circuit 22 include a DMA processor 24, a main microprocessor 26, which includes a coprocessor 28 and peripherals 30 and operates under a first operating system (OS1), a processor 32 (such as a DSP) and a coprocessor 34, coupled to processor 32. Processor 32 and coprocessor 34 operate under control of their own operating system, OSk. There may be any number of processors coupled to the L2 traffic control circuit 22, and each processor 23 may have its own operating system or it may be controlled by an operating system shared by a number of processors 23.

Each processor 23 is shown having a micro-TLB ("µTLB") 36, which stores a small number of entries, typically in the order of two to eight entries, used for translations from logical to physical addresses. The µTLBs 36 may be used in some or all of the processors coupled to the L2 traffic control circuit 22. While a single µTLB 36 is shown in each processor 23, multiple µTLBs 36 may be used in one or more of the processors 23. This would allow, for example, a processor to have separate µTLBs 36 for data and instructions.

Additionally, processor 26 and processor 32 are shown with core logic 38, local memory 40, and local caches 42. Naturally, the design of its processor will vary upon its purpose, and some processors may have significantly different designs than those shown in FIG. 2. One or more of the processors shown in FIG. 2 may be digital signal processors, and may include specialized circuitry for specific tasks.

The L2 traffic control circuit is also coupled to shared peripherals 44, an L2 cache subsystem 46, a shared TLB subsystem 48, and to level three (L3) traffic control circuit 50. L3 traffic control circuit 50 provides an interface to other system components, such as an external DMA processor 52, external memory 54, and display control 56. Display control 56 is coupled to frame memory 58 and an external display 60.

In operation, each processor operates using "virtual" addresses, which must be translated when accessing the main memory, or any other memory that uses physical addresses, such as a L1 or L2 cache. When a processor 23 having a µTLB 36 needs to access the external memory 54 or the L2 cache 46, it first checks its own µTLB 36 in to see if the translation is currently stored in the µTLB 36. If so, the processor 23 retrieves the physical address information from the µTLB 36 and uses the physical address information to access the memory.

If there is a miss in the µTLB 36, the memory access request is forwarded to the L2 shared TLB subsystem 48. The L2 shared TLB subsystem 48 maintains entries for multiple processors 23, as shown in greater detail in FIG. 3, discussed below. The L2 traffic control 22 determines priority from multiple requests to the shared TLB subsystem 48 from the various processors 23.

If there is a hit in the L2 shared TLB subsystem 48, the physical address information is retrieved from the L2 shared TLB subsystem 48 and is used to access the external memory 54. If there is a miss in the L2 shared TLB subsystem 48, the translation tables in the external memory are searched, as described in greater detail hereinbelow.

FIG. 3 illustrates the L2 shared TLB subsystem 48. The L2 shared TLB subsystem 48 includes a TLB control circuit 70, and a TLB memory 72. The TLB memory 72 stores virtual address records 74 and corresponding descriptor records 76. In the preferred embodiment, the virtual address records include a resource identifier (R_ID) field 78, a task identifier (Task_ID) field 80, a lock bit (L) field 82, a virtual address field 84, a section/page (S/P) field 86, and a valid bit (V) field 88. The descriptor records include a physical address field 90 and an attributes field 92.

Each entry in the TLB memory 72 has a resource identifier 78 along with task identifier 80. Resource identifiers 78 and task identifiers 80 are not extension fields of the virtual address (VA) but simply address qualifiers. A task identifier can be provided by a task-ID register associated with each processor 23. Similarly, resource identifiers can be provided by a resource-ID register associated with each processor 23. The task identifier identifies all entries in a TLB belonging to a specific task. They can be used, for instance, to invalidate all entries associated with a specific task without affecting entries associated with other tasks. The resource ID is used because the task identifier number on the different processors might not be related; therefore, task related operations must be, in some cases, restricted to a resource-ID.

In another embodiment, the resource identifier and task identifier registers are not necessarily part of the core of each resource and can be located elsewhere in the system, such as a memory mapped register for example, and associated to a resource bus. The only constraint is that a task identifier register must be under the associated OS control and updated during a context switch. The resource identifier registers must be set during the system initialization.

Referring still to FIG. 3, each TLB entry also includes a lock bit 82 to keep an entry from being replaced. Examples of address attributes 92 are described in Table 1.

TABLE 1

Memory Management Descriptors

| | |
|---|---|
| Execute Never | provides access permission to protect data memory area from being executed. This information can be combined with the access permission described above or kept separate. |
| Shared | indicates that this page may be shared by multiple tasks across multiple processors. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |
| Bufferability | Describes activation or behavior of write buffer for write accesses in this page. |
| Endianism | determines on a page basis the endianness of the transfer. |

An S/P field 86 specifies a section or page size. For example, a section may be 1 Mbyte in size, and an encoding allows page sizes of 64 kb, 4 kb and 1 kb to be specified. Naturally, the page size determines how many most significant (ms) address bits are included in a check for an entry.

A V field 88 indicates if an associated TLB cache entry is valid. V field 88 includes several V-bits that are respectively associated with resource identifier field 78 to indicate if a valid resource identifier entry is present, task identifier field 80 to indicate if a valid task-ID entry is present, and virtual address field 84 to indicate if a valid address entry is present.

The TLB control logic 70 may allocate the number of entries in the TLB memory 72 as desired. For example, it may be desirable to allocate a number of entries for each processor 23. However, it is desirable that the TLB memory 72 is not segmented for each processor 23, which would limit its flexibility. The TLB control logic, for example, could dynamically allocate the TLB memory during operation of the system 20 for optimum results. Alternatively, the TLB memory 72 could be allocated by task, or other criteria.

Each processor 23 accesses the TLB memory 72 by its resource identifier, a task identifier, and a virtual address. If these three fields match a record in the TLB memory 72, and the entry is valid, then there is a hit. In this case the physical address of the page associated with the request is specified by the physical address field 92 of the matching record. The corresponding attributes field may specify attributes of the page—for example, a page may be defined as read-only. In some applications, it may be desirable to match only the resource identifier and the virtual address or the task identifier and the virtual address.

In the event of a miss, the TLB control 70 provides a signal that there is no match in the TLB memory 72. In this case, the present invention can use either hardware or software to determine the physical address, without limiting the address translation to dedicated translation tables in the external memory 54, as is the case in the prior art.

In the system of FIGS. 2 and 3, the TLB memory 74 is presented with information that includes a resource identifier field, a task identifier field and a virtual address. When a miss occurs, any of these fields can be used by the system 20 to generate a translated address, either using hardware or software.

FIG. 4 illustrates an example of using hardware translation logic 100 in conjunction with the TLB control circuit 70 to determine a physical address. The virtual address, resource identifier and task identifier are presented to a logical circuit. Responsive to a miss in the L2 TLB memory 72, a control signal is received by the logic 100. Optionally, additional translation control information is presented to the translation logic 100 as well. The additional translation control information could be used to identify a desired technique for accessing the external memory 54 to perform the translation.

For example, a certain task may have an associated translation table in the external memory 54. Upon identifying a translation request as being related to that task, the translation logic 100 could access the translation table associated with the task to determine the physical address. The translation table associated with the task would be used independently of the processor requesting the translation.

Similarly, some (or all) of the various processors 23 could have associated translation tables in the external memory 54. Upon identifying a translation request as being related to a certain processor, the translation logic 100 could access the translation table associated with the processor to determine the physical address.

In addition to determining the physical address, the logic 100 could perform other functions, such as checking for protection, and so on.

Figure 5:
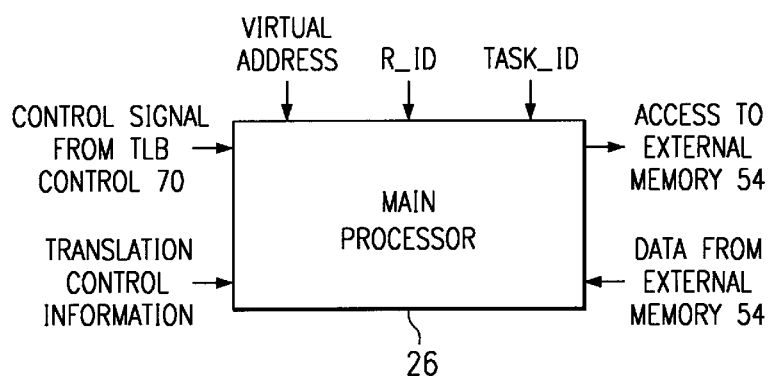
FIG. 5 illustrates a software translation control system.

FIG. 5 illustrates an alternative embodiment where software control is used to perform the translation in the case where there is a miss in the shared TLB subsystem 48. In this case, one of the processors 23 (the "main" processor), such as processor 26, handles interrupts related to misses in the shared TLB subsystem 48. When an interrupt is received from the TLB control circuit 70, the main processor performs a translation routine. The techniques used by the software translation can be the same as those that would used by the hardware translation, but they are more flexible since they can be modified easily by software, even dynamically during operation of the system 20.

The resource ID and task ID fields 78 and 80 provide significant functionality to the shared TLB structure. For example, the task ID field could be used to flush all TLB entries associated with a certain task, including tasks executed by multiple processors 23, when the task was finished, based on the task ID field 80. Similarly, all TLB entries with a given processor could be flushed based on the resource ID field 78. Other functions, such as locking or invalidating all entries based on task ID, resource ID or a combination of both fields could be performed as well. The combination of the shared TLB and the task and resource ID fields provides significant improvements to the performance of address translation in the device, since the allocation of the shared TLB resources can be optimized dynamically based on processors and task needs.

The embodiment described above provides significant advantages over the prior art. Specifically, it is not necessary to have separate translation tables in external memory 54 for each processor to support translation in the event of a miss in the shared TLB subsystem 48. The translation need not be performed using simple table walking, but can be based on any number of criteria. Further, the translation can be handled with either software or hardware, as desired.

Figure 6:
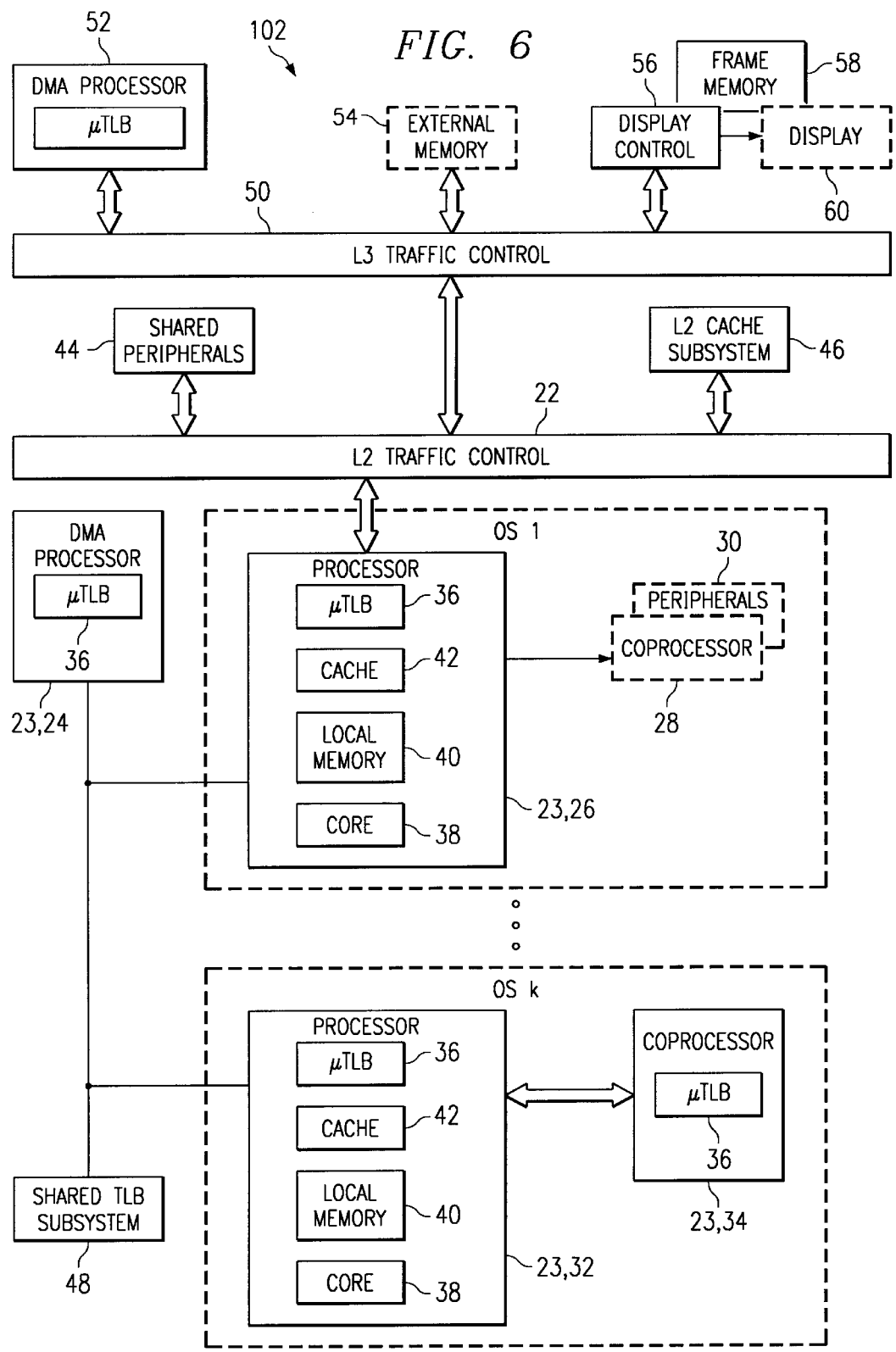
FIG. 6 illustrates a multiprocessor device using multiple operating systems, with a shared TLB external to the L2 traffic controller.

FIG. 6 illustrates a second embodiment of a multiprocessor system 102. This embodiment is similar to FIG. 1 in that multiprocessors 23 are operating under control of multiple operating systems (OS1–OSk). In this embodiment, however, the multiple processors 23 are not coupled to the shared TLB 48 via the L2 traffic controller 22, but through a separate bus structure 104 and an arbitrator 106. Arbitrator 106 arbitrates between multiple accesses to the shared TLB 48.

This embodiment may be more appropriate in applications where the L2 data/instruction bandwidth is heavily utilized or if there are a large number of μTLBs 36 accessing the shared TLB 48, which may induce latency spikes in the mainstream traffic.

FIG. 7 illustrates a third embodiment of a multiprocessor system where the multiprocessor system 110 includes multiple processors 23 controlled by a single operating system (OS). The overall architecture is similar to that of FIG. 6, using a separate bus structure to access the shared TLB 48. As before, the processors can include microprocessors, DSPs, coprocessors and DMA processors. A main processor, shown herein as processor 26, executes the operating system.

Also, as described above, each processor 23 is shown having a micro-TLB ("μTLB") 36, which stores a small number, typically in the order of 2–3, translations from logical to physical addresses. The μTLB 36 may be used in some or all of the processors coupled to the L2 traffic control circuit 22.

In operation, similar to the system 20 shown in connection with FIG. 2, each processor 23 operates using virtual addresses, which must be translated to physical addresses in order to access the external memory 54. When a processor 23 having a μTLB 36 needs to access the external memory 54 or the L2 cache 46, it first checks its own μTLB 36 in to see if the translation is currently stored in the μTLB 36. If so, the processor 23 retrieves the physical address information from the μTLB 36 and uses the physical address information to access the external memory. In the preferred embodiment, each processor 23 may access its μTLB 36 and the shared TLB subsystem 48 without intervention of the main CPU 26.

If there is a miss in the μTLB 36, the memory access request is forwarded to the L2 shared TLB subsystem 48.

The L2 shared TLB subsystem 48 maintains entries for multiple processors 23, as shown in greater detail in FIG. 8, discussed below. The L2 traffic control 22 determines priority from multiple requests to the shared TLB subsystem 48 from the various processors 23.

If there is a hit in the L2 shared TLB subsystem 48, the physical address information is retrieved from the L2 shared TLB subsystem 48 and is used to access the external memory 54. If there is a miss in the L2 shared TLB subsystem 48, the translation tables in the external memory are searched, as described in greater detail hereinbelow.

Figure 8:
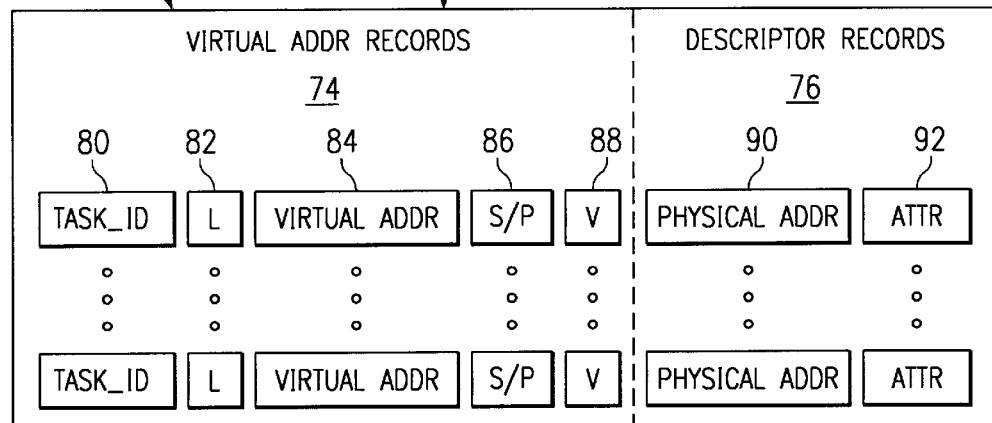
FIG. 8 illustrates a shared TLB subsystem for a single operating system device.

FIG. 8 illustrates the L2 shared TLB subsystem 48 for a device using a single operating system. The main difference between FIG. 3, representing a multiple OS system, and FIG. 8, representing a single OS system, is that a resource identifier is normally not needed in a single OS environment, since the OS is in control of virtual address allocation, and therefore overlapping virtual addresses by different processors 23 for different tasks can be prevented by the OS. The L2 shared TLB subsystem 48 includes a TLB control circuit 70, and a TLB memory 72.

As with the multiple OS system, either a hardware or software mechanism, such as those shown in FIGS. 4 and 5 can be used to service misses in the shared TLB subsystem 48. In the single OS case, however, the resource identifier is generally not needed for resolving the physical address.

It should be noted that the embodiments shown in FIGS. 2, 6 and 7 provide the DMA processors and coprocessors with a μTLB 36 and access to the shared TLB subsystem 48. This can provide a significant improvement in efficiency.

DMA processors and coprocessors act as slave processors to an associated master processor; i.e., DMA processors and coprocessors receive instructions from another processor, such as an MPU or a DSP, and process information at the command of the master processor. In the preferred embodiment, slave processors are programmed to access the shared TLB, if their function requires translation of virtual to physical addresses. When a memory access is needed, the slave processor can access the shared TLB (assuming a miss in its own μTLB 36, if present) without intervention of the associated master processor.

This aspect of the invention is particularly important when real-time functions, such as audio/video processing, are occurring. In this case, the master processor may not be able to perform logical-to-physical address translation for a slave processor without compromising the quality of the real-time operation. Accordingly, by providing and infrastructure where the slave processors can access the shared TLB directly, the translation occurs faster and without using the computing resources of the master processor.

The present invention provides significant advantages over the prior art. The use of small TLBs at the processor level improves speed without significant power increases. The shared TLB subsystem can significantly reduce the area attributed to the second level TLB system by using a single, larger TLB, as opposed to multiple smaller TLBs corresponding to each processor. Allocation of the entries in the shared TLB can be balanced depending upon each processor's requirements—generally, a DSP or a DMA process will normally require a smaller allocation than a microprocessor executing a larger OS. The efficiency is also improved by allowing independent access to the shared TLB by slave processors, such as DMA processors and coprocessors.

Figure 9:
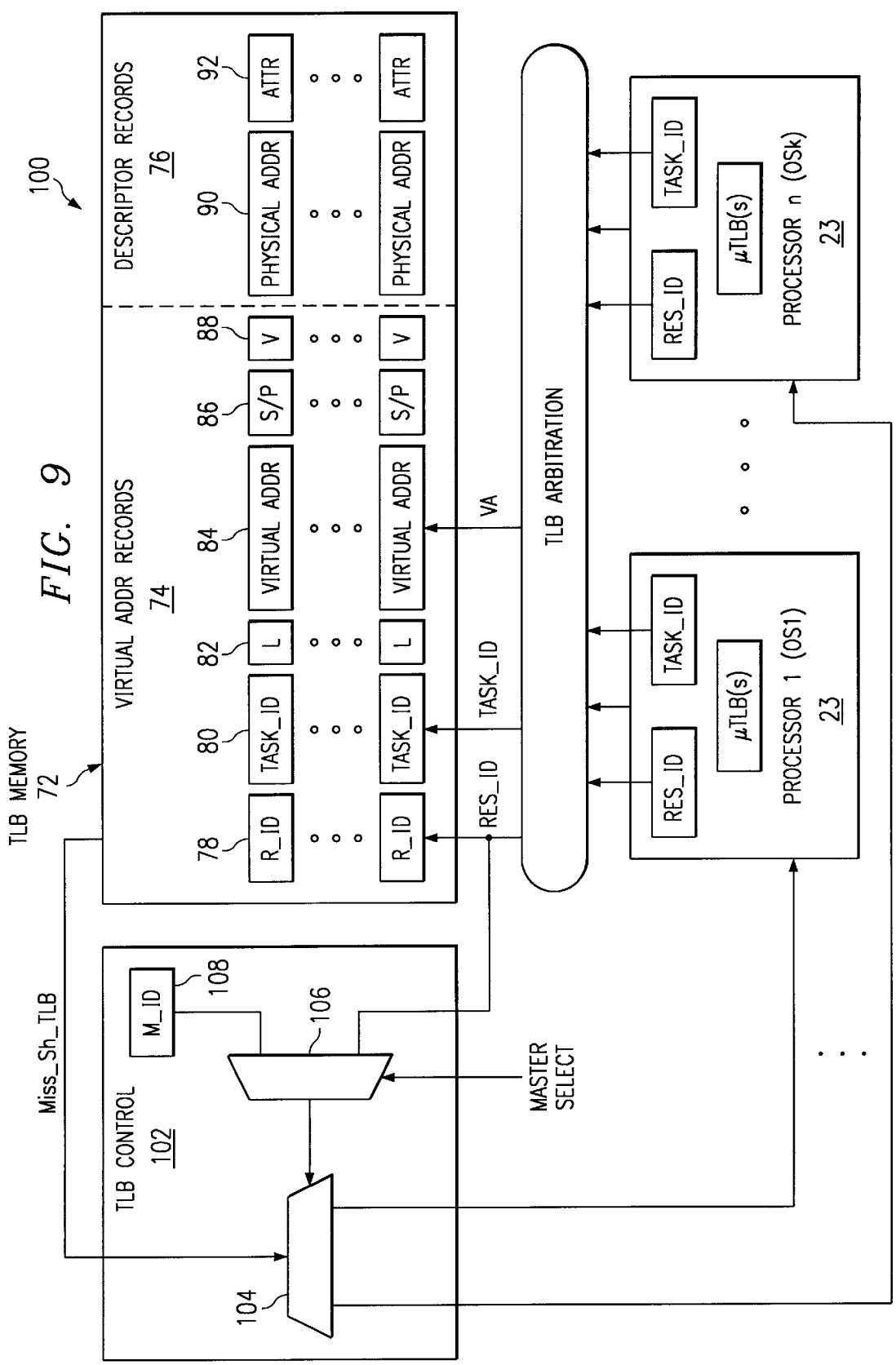
FIG. 9 illustrates a block diagram of an embodiment of a shared TLB subsystem with selectable servicing of TLB miss conditions.

FIG. 9 illustrates a block diagram of an embodiment of the invention wherein the shared TLB subsystem 100 selects the processor that services a TLB miss condition. FIG. 9 illustrates an embodiment for a multiple OS device; however, the same basic architecture could be used for a single OS system, as described in greater detail below.

The architecture of the shared TLB subsystem is similar to that shown above, with the addition of a TLB control circuit 102 including router 104 which activates an interrupt of exception on one of a plurality of processors responsive to a TLB miss signal (Miss_Sh_TLB) in accordance with a procedure indicated by the output of multiplexer 106. Multiplexer 106 selects between the resource_ID value present to the TLB memory 72 and a master_ID register 108 under control of a Master Select signal. The selected processor executes a using a software handling scheme to determine the physical address, as described above.

The processor that services the TLB miss can be selected in a number of ways. A first approach would be to use the resource_ID presented to the shared TLB memory 72, i.e., the resource_ID of the processor that initiated the shared TLB access. Processors that are under a given OS control (for example, a coprocessor which is a slave processor to another master processor) would be assigned a common resource_ID value with its master processor. In this case, if the slave processor initiated a shared TLB access that resulted in a TLB miss, its master processor would receive an interrupt or exception. In a single operating system device, the R_ID field 78 is normally not used and all processors resource_ID would be set to a master processor. This approach could be used to redirect the TLB miss handling routine to another processor in a fault-tolerant system.

The second approach would direct the interrupt of exception to a processor indicated by a preprogrammed value stored in the master_ID register 108. This approach could be used with cooperative operating systems or with a single OS and would permit the shared TLB to support operations based on resource_ID, such as flushing entries the shared TLB with a given resource_ID in power down mode, while routing service requests for TLB misses to one given processor.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. An integral multiprocessing device, comprising:
   a plurality of processing devices, including one or more master processing devices, each master processing device with one or more associated slave processing devices; and
   a non-segmented shared translation lookaside buffer coupled to said plurality of processing devices for storing information relating virtual addresses with physical addresses in a main memory, wherein said slave processing devices may access said shared translation lookaside buffer without intervention of the associated master processing device.

2. The integral multiprocessing device of claim 1 wherein said slave processing devices include a coprocessor.

3. The integral multiprocessing device of claim 1 wherein said slave processing devices include a DMA processor.

4. The integral multiprocessing device of claim 1 wherein said slave processing devices include a digital signal processor.

5. The integral multiprocessing device of claim 1 wherein said master processing devices include a microprocessor unit.

6. The integral multiprocessing device of claim 1 wherein said master processing devices include a digital signal processor.

7. The integral multiprocessing device of claim 1 wherein said slave processing devices obtain code from said associated master processing devices to enable communication with said shared translation lookaside buffer.

8. The multiprocessing device of claim 1 and farther including circuitry for determining physical address information responsive to a fault signal indicating that a received virtual address is not stored in said shared translation lookaside buffer.

9. An method of translating virtual addresses to physical addresses in integral multiprocessing device, comprising:
    transmitting virtual addresses from a plurality of processing devices including at least one master processing device and one or more one slave processing devices associated with one of said at least one master processing device; and
    receiving virtual addresses from said processing devices in a non-segmented shared translation lookaside buffer, wherein said one or more slave processing devices may access said shared translation lookaside buffer without intervention of the associated master processing device.

10. The method of claim 9 wherein said transmitting step includes the step of transmitting virtual addresses from a slave processing device comprising a coprocessor.

11. The method of claim 9 wherein said transmitting step includes the step of transmitting virtual addresses from a slave processing device comprising a DMA processor.

12. The method of claim 9 wherein said transmitting step includes the step of transmitting virtual addresses from a slave processing device using a digital signal processor.

13. The method of claim 9 wherein said transmitting step includes the step of transmitting virtual addresses from a master processing device comprising a microprocessor.

14. The method of claim 9 wherein said transmitting step includes the step of transmitting virtual addresses from a master processing device comprising a digital signal processor.

15. The method of claim 9 and further comprising the step of sending code from said associated master processing devices to a slave processing device to enable communication with said shared translation lookaside buffer.

16. The method of claim 9 and further including the step of determining physical address information responsive to a fault signal indicating that a received virtual address is not stored in said shared translation lookaside buffer.

17. The multiprocessing device of claim 1 wherein said translation lookaside buffer stores a task identifier associated with each virtual address, wherein each task identifier identifies a task executed by one of the processing devices.

18. The multiprocessing device of claim 1 and further comprising internal translation lookaside buffers associated with one or more of the processors, wherein a virtual address is passed to the shared translation lookaside buffer for a given processor only if there is a miss in the given processor's internal translation lookaside buffer.

19. The multiprocessing device of claim 1 and further comprising control logic for allocating entries in the shared translation lookaside buffer responsive to desired criteria.

20. The multiprocessing device of claim 19 wherein said control logic allocates entries for one or more of the processing devices.

21. The multiprocessing device of claim 19 wherein said control logic allocates entries for one or more tasks executed by the processing devices.

22. The multiprocessing device of claim 19 wherein allocations of entries may be dynamically adjusted.

23. The method of claim 9 and further comprising the step of storing a task identifier associated with each virtual address in the shared translation lookaside buffer, wherein each task identifier identifies a task executed by one of the processing devices.

24. The method of claim 9 and further comprising the step of storing translations of virtual addresses to physical address in an internal translation lookaside buffers associated with one or more of the processors, wherein a virtual address is passed to the shared translation lookaside buffer for a given processor only if there is a miss in the given processor's internal translation lookaside buffer.

25. The method of claim 9 and further comprising the step of allocating entries in the shared translation lookaside buffer responsive to desired criteria.

26. The method of claim 25 wherein said allocating step comprises the step of allocating entries for one or more of the processing devices.

27. The method of claim 25 wherein said allocating step comprises the step of allocating entries for one or more tasks executed by the processing devices.

28. The method of claim 25 wherein allocations of entries may be dynamically adjusted.

* * * * *